Jan. 26, 1932.  M. DE TERRA  1,843,067
STOMATOSCOPE FOR DENTISTS
Filed Feb. 5, 1931
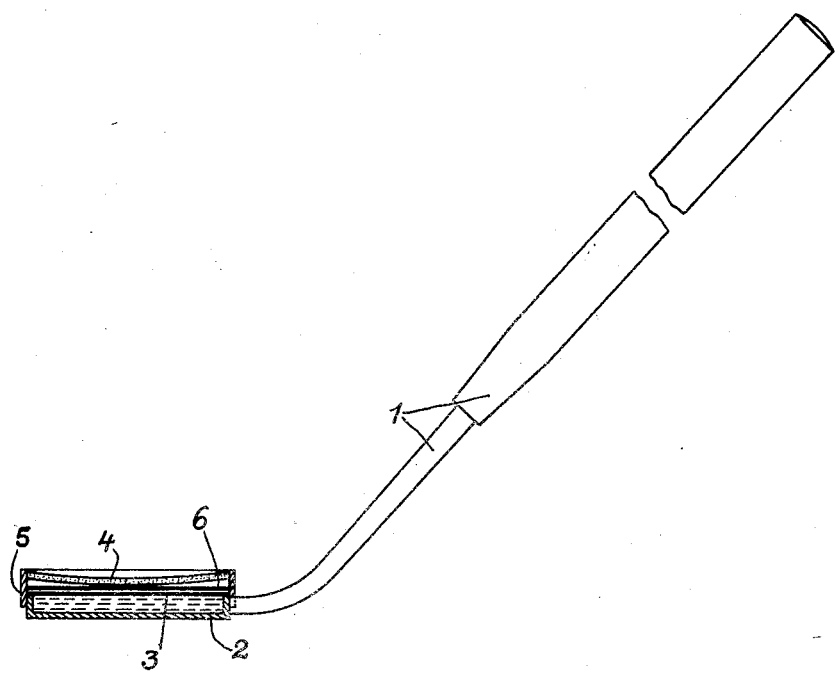

Patented Jan. 26, 1932

1,843,067

UNITED STATES PATENT OFFICE

MAXIMILIAN DE TERRA, OF ZURICH, SWITZERLAND

STOMATOSCOPE FOR DENTISTS

Application filed February 5, 1931, Serial No. 513,682, and in Germany January 7, 1931.

The present invention relates to improvements in stomatoscopes for dentists. According to this invention a heat conductor is inserted between the mirror plate and a substance preventing the breath tarnishing thereof, said heat conductor consisting of a material increasing the heat storing capacity of said substance.

On the accompanying drawing one embodiment of the present invention is illustrated in a sectional view.

On a handle 1 there is fixed a liquid receptacle 2 filled with oil, preferably glycerine and made air tight by a copper plate 3 soldered on top of this receptacle. Upon said receptacle 2 there is fitted a rim 5 surrounding the mirror plate 4 and a copper plate 6 having the same dimensions as the first mentioned copper plate 3. The rim 5 is brought to such a position on the receptacle 2 that the upper copper plate 6 is touching the lower copper plate 3 on its whole surface.

For using the stomatoscope the rim 5 is removed therefrom, the copper plate 3 of the liquid receptacle is heated on the gas-flame needed besides that for heating the other instruments. Thereupon the rim 5 is again set on the receptacle 2. Due to the close contact of the copper plates 3 and 6 on the whole surfaces thereof the heat taken off by the copper plate 3 is at once transmitted to the plate 6 and at the same time to the glycerine contained in the receptacle 2 and is reflected therefrom. The good heat conductivity of the copper permits to use the stomatoscope immediately after its heating. The glycerine which takes up the heat less quickly gives off the heat slowly owing to its greater heat storing capacity, therefore radiates the heat during a longer period and keeps warm the copper plates. This action represents a considerable enrichment of heat on the mirror body relatively to dental mirrors without copper layer and permits of a longer continuous using of the stomatoscope until a following reheating on the gas-flame becomes necessary. The troublesome breath tarnishing of the mirror-plate caused by the breath of the patient is practically removed, tests having shown that the mirror plate as kept free from being clouded by the condensation of the breath for a period of ten minutes. Renewal of the liquid is not necessary.

Instead of copper the plates 3 and 6 can be made of another material with good heat conductivity such as for instance silver.

What I claim is:

1. Stomatoscope for dentists, comprising a casing, an oily liquid contained in this casing, a heat conducting plate air-tightly closing said casing, a rim adapted to be fitted on said casing a mirror plate fixed on this rim, a second heat conducting plate of the same size as the first mentioned plate also fixed on this rim and adapted to be brought in contact with the other plate when said rim is set on the casing.

2. Stomatoscope for dentists, comprising a casing, glycerine contained in this casing, a copper-plate air-tightly closing this casing, a rim adapted to fit on said casing, a copper plate of the same size as the above mentioned copper plate being fixed on said rim in such position as to be brought in close contact with said copper-plate when the rim is set on the casing, a mirror-plate fixed on said rim and surrounded by the upper part thereof.

In testimony whereof I have affixed my signature.

MAXIMILIAN DE TERRA.